(12) United States Patent
Mayer et al.

(10) Patent No.: US 11,397,238 B2
(45) Date of Patent: Jul. 26, 2022

(54) RADAR SYSTEM HAVING AN ENCRYPTABLE DATA LINE

(71) Applicant: Robert Bosch GmbH, Stuttgart (DE)

(72) Inventors: Marcel Mayer, Lonsee (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 181 days.

(21) Appl. No.: 16/770,573

(22) PCT Filed: Nov. 8, 2018

(86) PCT No.: PCT/EP2018/080695
§ 371 (c)(1),
(2) Date: Jun. 5, 2020

(87) PCT Pub. No.: WO2019/137656
PCT Pub. Date: Jul. 18, 2019

(65) Prior Publication Data
US 2021/0165070 A1    Jun. 3, 2021

(30) Foreign Application Priority Data

Jan. 11, 2018  (DE) .......................... 102018200396.3

(51) Int. Cl.
| *G01S 7/00* | (2006.01) |
| *G01S 7/03* | (2006.01) |
| *G01S 13/931* | (2020.01) |

(52) U.S. Cl.
CPC ................ *G01S 7/003* (2013.01); *G01S 7/03* (2013.01); *G01S 13/931* (2013.01)

(58) Field of Classification Search
None
See application file for complete search history.

(56) References Cited

U.S. PATENT DOCUMENTS

| 7,498,940 B2 * | 3/2009 | Pettus ................. H01Q 21/065 340/572.1 |
| 8,774,837 B2 * | 7/2014 | Wright ................ G08G 1/0965 705/16 |

(Continued)

FOREIGN PATENT DOCUMENTS

| CN | 106950548 A | 7/2017 |
| JP | H05225105 A | 9/1993 |

(Continued)

OTHER PUBLICATIONS

International Search Report for PCT/EP2018/080695, dated Jan. 24, 2019.

*Primary Examiner* — Peter M Bythrow
(74) *Attorney, Agent, or Firm* — Norton Rose Fulbright US LLP; Gerard Messina

(57) ABSTRACT

A radar system for a vehicle, having at least one central control unit for transmitting data and for processing received data, at least one radar sensor head, which is set apart from the at least one central control unit and has at least one transmitting antenna for generating and at least one receiving antenna for receiving radar waves. The radar system includes at least one data line between the at least one central control unit and the at least one radar sensor head, with the at least one data line having at least one security unit for the encryption, decryption and/or signing of measuring data or control instructions.

11 Claims, 1 Drawing Sheet

(56) References Cited

U.S. PATENT DOCUMENTS

| | | | |
|---|---|---|---|
| 10,302,759 B1* | 5/2019 | Arteaga | G08G 5/0082 |
| 10,390,221 B2* | 8/2019 | Lawlis | H04L 9/14 |
| 10,530,816 B2* | 1/2020 | Chen | H04L 63/205 |
| 2004/0083035 A1* | 4/2004 | Ellis | A61H 3/068 |
| | | | 701/1 |
| 2004/0145496 A1* | 7/2004 | Ellis | G09B 21/006 |
| | | | 340/905 |
| 2009/0178486 A1* | 7/2009 | Klee | G01S 15/931 |
| | | | 73/629 |
| 2012/0254923 A1* | 10/2012 | Riedel | H04N 7/183 |
| | | | 725/76 |
| 2016/0018511 A1* | 1/2016 | Nayyar | G01S 7/03 |
| | | | 342/27 |
| 2016/0320482 A1* | 11/2016 | Ling | G01S 7/412 |
| 2016/0349365 A1* | 12/2016 | Ling | G01S 13/42 |
| 2017/0090015 A1* | 3/2017 | Breen | G01S 13/87 |
| 2017/0153314 A1* | 6/2017 | Siemes | G01S 13/347 |
| 2018/0259621 A1* | 9/2018 | Yamazaki | G01S 13/931 |
| 2019/0163178 A1* | 5/2019 | Sidle | G01S 13/862 |
| 2019/0256047 A1* | 8/2019 | Iwashita | B60R 25/245 |
| 2021/0200213 A1* | 7/2021 | Gillett | G01S 17/931 |

FOREIGN PATENT DOCUMENTS

| | | |
|---|---|---|
| JP | 2012502572 A | 1/2012 |
| JP | 2015019189 A | 1/2015 |
| JP | 2015076805 A | 4/2015 |
| JP | 2016050778 A | 4/2016 |
| JP | 2017153082 A | 8/2017 |
| WO | 2014095886 A1 | 6/2014 |

\* cited by examiner

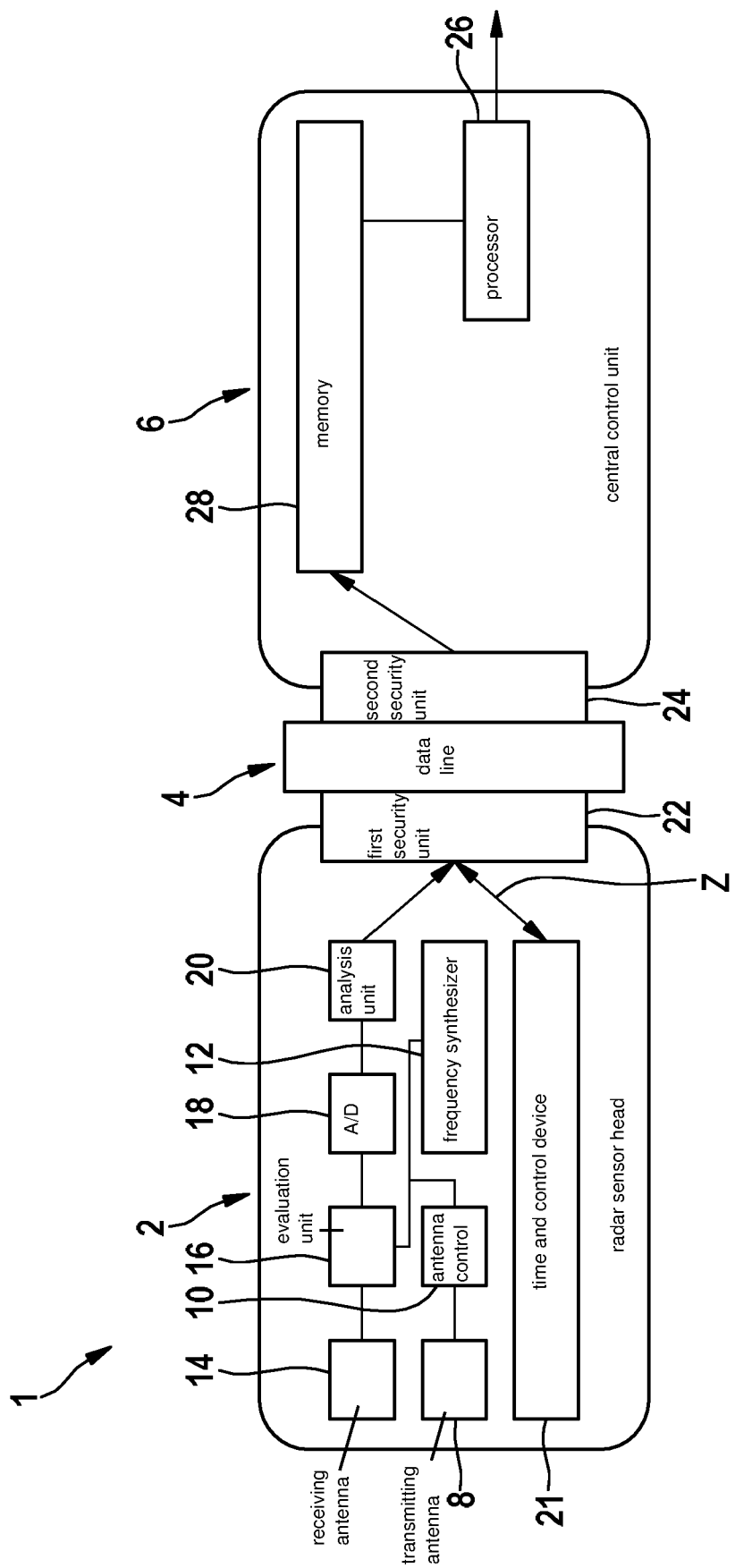

RADAR SYSTEM HAVING AN ENCRYPTABLE DATA LINE

The present invention relates to a radar system for a vehicle, which has a central control unit for transmitting data and for processing received data, at least one radar sensor head, which is set apart from the central control unit and has at least one transmitting antenna for generating and at least one receiving antenna for receiving radar waves, and at least one data line between the central control unit and the at least one radar sensor head.

BACKGROUND INFORMATION

In vehicles that offer a high level of driver assistance functions or automated driving functions, an ever increasing number of radar sensors is installed. Through a greater number of radar sensors, a higher performance of the automated or semi-automated driving functions is meant to be achieved in comparison with individual radar sensors. Current solutions in this area are made up of radar sensors which carry out extensive data processing of the received radar waves within the sensor. The radar sensors are thus able to supply data at an object or location level for the further evaluation by the vehicle. This makes it possible to reduce the data quantity transmitted to the vehicle, but the respective radar sensors have to have a greater processing power and a larger memory.

Disadvantageous in this case is that the processing power and the memory size are relatively difficult to scale with regard to a greater performance. This is a consequence in particular of the fact that based on a defined demand on the performance capacity, the microcontroller technology is no longer sufficient for the required processing steps of the received radar waves. To increase the performance capacity, the required calculations and analyses thus have to be carried out inside the sensor within the framework of microprocessor technologies. This may have a disadvantageous effect on the price, size and on power losses of a radar sensor.

In addition, defined demands are made on the manipulation security and the availability or reliability of the sensor system relevant for the driving function, in particular in the case of highly automated vehicles.

SUMMARY

An object of the present invention is to provide a radar system for vehicles which is scalable in its performance capacity in a cost-effective and flexible manner and is protected against interventions by third parties.

This objective may be achieved in accordance with example embodiments of the present invention. Advantageous embodiments of the present invention are described herein.

According to one aspect of the present invention, a radar system is provided for a vehicle. The radar system has at least one central control unit for transmitting data and for processing received data. In addition, the radar system has at least one radar sensor head, which is set apart from the central control unit and has at least one transmitting antenna for generating radar waves and at least one receiving antenna for receiving radar waves. The radar system includes at least one data line between the at least one central control unit and the at least one radar sensor head for the transmission of data. According to the present invention, the at least one data line has at least one security unit for the encryption, decryption and/or signing of measuring data or control instructions.

Under the aspect that a plurality of radar sensors is employed in a vehicle, it is advantageous to concentrate the required computing power in at least one central control unit. The respective radar sensors can thus be developed as compact and cost-effective radar sensor heads without any significant power losses. This makes it possible to realize an overall more optimal price-performance ratio and a higher performance capacity of the radar system.

In the radar system according to the present invention, the at least one radar sensor head includes components for generating and transmitting radar waves as well as components for receiving and processing received radar waves. The processing of the received radar waves is kept to a minimum or is carried out at the lowest expense possible. In particular, the measuring data of the received radar waves are able to be digitized by an analog-to-digital converter and then be transmitted with a high bandwidth to the at least one central control unit. The further processing of the digitized measuring data from the at least one radar sensor head may subsequently be performed in the at least one central control unit.

This makes it possible to reduce the expense for the respective radar sensor heads because the individual radar sensor heads require less processing power. In addition, a power loss in the respective radar sensor heads may be lower on account of the smaller number of processing steps. Although the computational effort becomes greater in the at least one central control unit, the computing power is more easily scalable or is scalable with less effort in comparison with the arising costs. In an overall view of the radar system, the radar system according to the present invention is able to be expanded and scaled in a cost-effective and flexible manner in comparison with current solutions. In addition, more complex and more efficient algorithms are able to be used for processing the received radar waves because of the higher computing power of the at least one central control unit.

With the aid of the at least one security unit, the measuring data ascertained by the at least one radar sensor head are able to be encrypted and transmitted to the at least one control unit via the at least one data line. The at least one control unit has the ability to decrypt or decode and further process the encrypted data. Alternatively or additionally, the measuring data may be provided with a signature by the at least one security unit. This makes it possible to mark the transmitted measuring data, for example with unique identification numbers, and to transmit them to the at least one central control unit. In parallel with the measuring data, control instructions are also able to be protected against access by third parties with the aid of an encryption method.

In this way, the entire radar system is protectable against accesses, manipulations or espionage. Preferably, the at least one security unit is able to encrypt and decrypt the transmitted or arriving measuring data or control instructions in a bidirectional manner. In addition, through this safeguard, greater reliability of the radar system, which is adapted to the demands of autonomous vehicles, is able to be ensured.

For example, the encryption may be used to make the transmitted measuring data actually "undecipherable" or also for signing as MAC (Message Authentication Code) in an electronic component.

The at least one data line is preferably developed as what is termed a high speed interface. The at least one data line may be embodied as a serial data transmission featuring a clock pulse recuperation.

According to one exemplary embodiment of the radar system according to the present invention, the radar waves received by the at least one receiving antenna of the at least one radar sensor head are able to be converted into digital measuring data with the aid of an analog-to-digital converter and be marked by at least one item of time information. In this way, the received radar waves or measuring data are able to be converted into a digital format and thus be further processed more easily. The measuring data converted into a digital format may advantageously be provided with a time stamp. For example, each recorded spectrum is able to receive its own time stamp.

According to a further exemplary embodiment of the radar sensor according to the present invention, the at least one radar sensor head has an analysis unit for performing a fast Fourier transform, which is connected downstream from the analog-to-digital converter and upstream from the at least one data line. With the increasing improvement in electrotechnical production methods, it is possible to additionally integrate a first processing stage into a high-frequency component, e.g., what is termed a monolithic microwave integrated circuit (MMIC). This may preferably be an analysis unit for carrying out a Fourier analysis. For example, the analysis unit may perform a range FFT of the digitized measuring data. Depending on the used modulation methods, other Fourier transforms may be employed as well. This first processing stage is usually able to be integrated into the existing components of a radar sensor head in a cost-effective manner because the required space in the high frequency component is very small and the memory requirement is low. As a result, the used silicon area may normally remain unchanged in the production of corresponding high frequency component. The scanning values or received radar waves are thus not directly transmitted after the digitization but are first subjected to a first processing stage. For example, the fast Fourier transform may be adapted to the respective application purpose. The fast Fourier transform may possibly be able to be carried out only up to the anti-aliasing filter limit, for instance.

According to a further exemplary embodiment of the radar system according to the present invention, a block encryption or block decryption is able to be carried out by the at least one security unit for the encryption and/or decryption of measuring data or control instructions. In a radar sensor head the use of an encryption method including a block encryption may be advantageous because the measuring data are also available in block form. This may be useful for different partitionings, processing steps or methods of the radar system when the data are available in the form of blocks, for example. For instance, this may be data of a frequency ramp or an OFDM symbol. An AES (Advanced Encryption Standard) block encryption, for example, may be used for this purpose. Important security specifications, in particular for automated or semi-automated driving, are able to be satisfied by the encryption.

According to a further exemplary embodiment of the radar system according to the present invention, the at least one data line has two security units disposed at the ends. In particular in the case of bidirectional connections, it is also possible to encrypt the transmission of control instructions in order to protect important parameters such as modulation data. In addition, in a bidirectional placement of the security units, the transmitted data are able to be provided with additional information such as a data size and a data count. As a result, it can be checked at the end of each data transmission whether the data were transmitted in their entirety via the at least one data line or whether a faulty transmission has taken place.

According to one further exemplary embodiment of the radar system according to the present invention, the at least one radar sensor head has at least one security unit for securing at least one data stream or one data packet. This makes it possible to protect processing steps within the at least one radar sensor head. For example, a transmission of the ascertained measuring data from the analog-to-digital converter to the analysis may also be carried out in encrypted form. Depending on a development of the radar system, it may thus be ensured that the at least one radar sensor head has not been manipulated.

According to a further exemplary embodiment of the radar system according to the present invention, the digital measuring data are transmittable via the at least one data line to the central control unit and able to be synchronized in the central control unit using the at least one item of time information. Because of the first processing of the received measuring data in the radar sensor head, buffering or a delay on account of the arising data quantity may also occur. The resulting deviations between the at least one radar sensor head and the at least one central control unit are able to be compensated for on the basis of the assigned item of time information. The item of time information may preferably be realized in the form of a time stamp or a plurality of time stamps. The time stamps may thus be used for a time synchronization of the measuring data between the at least one radar sensor head of the at least one central control unit. In this way, even measuring data that are transmitted to the at least one central control unit with a delay are able to be correctly classified in terms of time and used for further applications or calculations.

According to another exemplary embodiment of the radar system according to the present invention, the at least one item of time information is able to be generated by a time and control device situated in the at least one radar sensor head. The at least one radar sensor head may thus include an additional circuit, which is situated in parallel with the analog-to-digital converter. The time and control device, for instance, is able to receive and implement control instructions transmitted via the at least one data line and to provide the digitized measuring data with precise time data. In addition, the time and control device is able to be used for a control of the at least one radar sensor head as well as for the monitoring control or a cycle control, for example. In order to allow for a time synchronization to take place in the radar system, the time and control device has to add time stamps to the transmitted measuring data, for example for each transmitted chirp or each transmitted cycle, so that the at least one central control unit is able to utilize the transmitted measuring data in a meaningful way.

According to an additional exemplary embodiment of the radar system according to the present invention, the data transmitted via the at least one data line are transmittable at a higher data rate than a reference frequency of a frequency synthesizer of the at least one radar sensor head. To allow for an optimal operation of the time and control device for the control or regulation of the at least one radar sensor head, the transmission of the data via the at least one data line must take place with a higher time resolution than the radar operation. In this way, additional functions such as safety functions for monitoring frequency deviations of different oscillators of the frequency synthesizer are able to be integrated into the radar system according to the present invention. The higher time resolution for the data transmission is technically easy to realize within the scope of an MMIC technology because the technology allows for frequencies of multiple Gigahertz. A time stamp is therefore transmittable without any problems at 1 GHZ and a time resolution of 1 ns, for instance. The internal reference frequency, for example, may be 50 MHz for a PLL reference of the at least one transmitting antenna, which means that the data rate according to the example must be higher than 50 Mbit/s.

According to another exemplary embodiment of the radar system according to the present invention, the at least one central control unit has at least one processor for processing received data and at least one memory for the at least intermittent storage of data. As a result, the at least one central control unit is able to store the measuring data from at least one radar sensor head transmitted via the at least one data line at least temporarily and process, forward or output it according to a request of the respective application. If required, the at least one central control unit is able to be exchanged for a more powerful control unit. Since microprocessor technology is already being employed here, complex algorithms for processing the measuring data may be used and more precise calculation results be achieved as a consequence.

Below, a preferred exemplary embodiment of the present invention is described in greater detail based on a heavily simplified schematic illustration.

BRIEF DESCRIPTION OF THE DRAWING

FIG. 1 shows a schematic representation of a radar system according to a first specific embodiment of the present invention.

DETAILED DESCRIPTION OF EXAMPLE EMBODIMENTS

FIG. 1 shows a schematic representation of a radar system 1 according to a first specific embodiment of the present invention. In this instance, radar system 1 is made up of a radar sensor head 2, which is coupled via a data line 4 with a central control unit 6.

Radar sensor head 2 has at least one transmitting antenna 8, which is operable via an antenna control 10. Antenna control 10 is connected to a frequency synthesizer 12 for the generation of a carrier frequency of the radar waves.

In addition, at least one receiving antenna 14 including a corresponding evaluation unit 16 for receiving radar waves is situated in radar sensor head 2. The received radar waves are able to be converted into digital measuring data by an analog-to-digital converter 18 and then be transformed by an analysis unit 20 in radar sensor head 2 in a first processing step.

After the first processing step, the measuring data are encrypted by a first security unit 22 and subsequently transmitted via data line 4 to central control unit 6. A further security unit 24 is situated at the end of data line 4. As a result, after the transmission, the transmitted measuring data are able to be decoded or decrypted by second security unit 24. In a reverse order, control instructions ST are able to be transmitted from central control unit 6 to a time and control device 21 of radar sensor head 2, and second security unit 24 is able to encrypt control instructions ST or data and first security unit 22 is able to decrypt transmitted control instructions ST or data.

A time stamp Z is allocated to the transmitted digital measuring data by a time and control device 21 situated in radar sensor head 2 and transmitted to central control unit 6 as well. This step is carried out even prior to an encryption by first security unit 22.

Central control unit 6 is able to receive the transmitted digital measuring data and further process the data. Because of time stamps Z transmitted together with the measuring data, the measuring data are able to be precisely categorized in terms of time.

Central control unit 6 has at least one processor 26 for processing received data, and at least one memory 28 for the at least intermittent storage of received digital measuring data.

What is claimed is:

1. A radar system for a vehicle, the radar system comprising:
    at least one central control unit configured to transmit data and to process received data;
    at least one radar sensor head which is set apart from the at least one central control unit and has at least one transmitting antenna for generating and at least one receiving antenna for receiving radar waves; and
    at least one data line between the at least one central control unit and the at least one radar sensor head, wherein the at least one data line has at least one security unit configured to: (i) encrypt measuring data or control instructions, and/or (ii) decrypt the measuring data or control instructions, and/or (iii) sign the measuring data or control instructions.

2. The radar system as recited in claim 1, wherein the radar waves received by the at least one receiving antenna of the at least one radar sensor head converted into digital measuring data using an analog-to-digital converter and are marked by at least one item of time information.

3. The radar system as recited in claim 2, wherein the at least one radar sensor head has an analysis unit configured to perform a fast Fourier transform, which is connected downstream from the analog-to-digital converter and upstream from the at least one data line.

4. The radar system as recited in claim 1, wherein a block encryption or block decryption carried out by the at least one security unit for the encryption of the measuring data or control instructions and/or decryption of the measuring data or control instructions.

5. The radar system as recited in claim 1, wherein the at least one data line has two security units disposed at opposite ends of the data line.

6. The radar system as recited in claim 1, wherein the at least one radar sensor head has at least one security unit configured to secure at least one data stream or one data packet.

7. The radar system as recited in claim 2, wherein the measuring data are transmittable via the at least one data line to the at least one central control unit and synchronized in the at least one central control unit using the at least one item of time information.

8. The radar system as recited in claim 2, further comprising a time and control device situated in the at least one radar sensor head and configured to generate the at least one item of time information.

9. The radar system as recited in claim 1, wherein the data transmitted via the at least one data line are transmittable at a higher data rate than a reference frequency of a frequency synthesizer of the at least one radar sensor head.

10. The radar system as recited in claim 1, wherein the at least one central control unit has at least one processor configured to process received data and at least one memory for at least intermittent storage of data.

11. The radar system as recited in claim 1, wherein the data line is upstream of the transmitting antenna.

* * * * *